United States Patent
Kennedy (10) Patent No.: US 8,509,219 B2
(45) Date of Patent: Aug. 13, 2013

(54) METHOD, SERVER DEVICE AND CONVERTING DEVICE FOR SETTING UP A PAYLOAD-DATA CONNECTION

(75) Inventor: Stephan Kennedy, Windach (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1062 days.

(21) Appl. No.: 11/988,324

(22) PCT Filed: Jun. 9, 2006

(86) PCT No.: PCT/EP2006/063051
§ 371 (c)(1),
(2), (4) Date: Jun. 8, 2009

(87) PCT Pub. No.: WO2007/003483
PCT Pub. Date: Jan. 11, 2007

(65) Prior Publication Data
US 2009/0303983 A1    Dec. 10, 2009

(30) Foreign Application Priority Data
Jul. 4, 2005  (DE) .......................... 10 2005 031 167

(51) Int. Cl.
*H04L 12/66*  (2006.01)
(52) U.S. Cl.
USPC ........... 370/352; 370/385; 370/401; 709/223; 709/247
(58) Field of Classification Search
USPC .................................. 370/352, 466
See application file for complete search history.

(56) References Cited

U.S. PATENT DOCUMENTS

| 6,600,738 | B1 * | 7/2003 | Alperovich et al. | 370/352 |
| 2003/0016807 | A1 * | 1/2003 | Otsuka | 379/219 |
| 2003/0219006 | A1 | 11/2003 | Har | |
| 2004/0076145 | A1 * | 4/2004 | Kauhanen et al. | 370/352 |
| 2004/0240399 | A1 | 12/2004 | Corrao et al. | |
| 2004/0252681 | A1 * | 12/2004 | Rabipour et al. | 370/360 |
| 2006/0034260 | A1 * | 2/2006 | Svedberg et al. | 370/352 |

FOREIGN PATENT DOCUMENTS

| CN | 1382348 A | 11/2002 |
| WO | WO 2004/075582 A1 | 9/2004 |
| WO | WO 2004/082254 A1 | 9/2004 |

* cited by examiner

Primary Examiner — Asad Nawaz
Assistant Examiner — Justin N Mullen
(74) Attorney, Agent, or Firm — Buchanan Ingersoll & Rooney PC (57) ABSTRACT

There is described a transmission of user data from a source communications device provided with a first encoder for encoding users data to a target communications device provided with a first decoder for decoding said user data via a communication network which is provided with several converting devices comprising additional encoders and additional decoders for carrying out a verification of the converting devices. Via the verification it is determined, whether the first encoder is compatible with the decoder of a given converting device and, whether the first decoder is compatible with the encoder of said converting device. One of the converting devices for which the compatibility is ascertained by the verification is selected for transmitting user data. During transmission of the user data, said user data encoded with the aid of the first encoder is decoded with the aid of the compatible decoder of the converting device and the user data decodable with the aid of the first decoder is encoded with the aid of the compatible encoder of the selected converting device.

15 Claims, 8 Drawing Sheets

METHOD, SERVER DEVICE AND CONVERTING DEVICE FOR SETTING UP A PAYLOAD-DATA CONNECTION

CROSS REFERENCE TO RELATED APPLICATIONS

This application is the US National Stage of International Application No. PCT/EP2006/063051, filed Jun. 9, 2006 and claims the benefit thereof. The International Application claims the benefits of German application No. 10 2005 031 167.9 DE filed Jul. 4, 2005, both of the applications are incorporated by reference herein in their entirety.

FIELD OF INVENTION

The invention relates to a communication system using a network to transmit payload data.

BACKGROUND OF INVENTION

In contemporary communications systems, it is known for payload data, e.g. relating to voice, video or multimedia communication, to be transmitted via packet-oriented networks. The use of packet-oriented data transmission methods frequently results in losses in the quality of the payload data being transmitted, such losses frequently being due to conversions and delays of payload-data packets in network nodes.

Based upon the frequently used Internet Protocol, also called IP for short, communication terminals which operate on the basis of a packet-oriented transmission technology will also be referred to below using the term "IP terminal". In the packet-oriented transmission of payload data, the terms "Voice over IP", VoIP for short, and "Multimedia over IP", MoIP, are also commonplace.

In the packet-oriented network, a connection between IP terminals is normally routed via network elements such as routers, switches or gateways. A distinction is frequently made between signaling connections and payload-data connections. Here, routers normally switch data between packet-oriented networks, while gateways link different networks.

The network elements and IP terminals may comprise functions for the coding—also called encoding—and decoding of payload data by means of codecs (codec: coding and decoding). At the same time, a network element or an IP terminal each frequently comprise several codecs, in particular for different types of payload data, for different bandwidths and for different levels of payload-data quality after decoding.

Payload data, also called payload, includes e.g. voice/sound, video or multimedia data. Codecs frequently used for voice encoding include e.g. the non-compressing G.711 codec or the compressing G.729 codec of the ITU (International Telecommunications Union). Codecs for video encoding include e.g. the MPEG-1-Video codec or MPEG-2-Video codec of the MPEG committee (MPEG: Motion Picture Experts Group).

A communications system is frequently characterized by having a structure comprising individual subnetworks, the subnetworks frequently being linked to one another via gateways. Payload data and signaling data can be transmitted between an IP terminal and a gateway, as well as between two gateways respectively, it being possible for a specific transmission method to be selected for each of these sub-connections—e.g. a first sub-connection from a first IP terminal to a gateway and a second sub-connection from said gateway to a second IP terminal. This selection is based in particular on the codecs available in the respective IP terminals and gateways and on the transmission protocols provided.

In the case of a connection between two IP terminals, the payload data can be routed via several gateways, particularly where the communication connection extends over several subnetworks. Usually, incoming payload data is buffered in each gateway by means of a jitter buffer, decoded with a codec selected for an incoming sub-connection and, for forwarding of the payload data, encoded with a further codec selected for a further sub-connection. This can lead to a delay of the payload data, in particular as a result of the buffering. Furthermore, the encoding and decoding can lead to a deterioration in the quality of the payload data, particularly if compressing codecs are used, and consequently, during each conversion, i.e. encoding and decoding, payload-data information may be lost.

Furthermore, in many cases, multiple conversion into a transmission method or protocol supported by the respective subnetwork is required, particularly if the IP terminals and the gateways do not support the same encoding method. This may lead to a deterioration in the quality of a connection as a result of multiple decoding and encoding, data compression in the sub-connections and use of a codec not suited to the bandwidth available.

Normally, when setting up a connection between two IP terminals linked via a gateway, for sub-connections from the first IP terminal to the gateway and from the gateway to the second IP terminal, in particular an encoding method of the communications partners for the respective sub-connections is exchanged and negotiated by means of signaling and/or acknowledgment messages. Upon connection acceptance by the called second IP terminal, the payload data is transmitted via the first and second sub-connection between the respective communications partners of these sub-connections with the negotiated encoding method for the respective sub-connections, buffering and decoding and encoding of the payload data being carried out in the gateway with the respective encoding method for the sub-connections.

In known methods for the transmission of payload data, the IP terminals and/or the gateways, as communications partners of a sub-connection, have to select the same or compatible codecs for encoding and decoding, in order that the receiving communications partner can decode the received encoded data. Here, compatible codecs means that encoded payload data of the communications partner can be decoded—possibly with a loss of quality.

To rectify at least some of the disadvantages stated, IP terminals which support the ITU-T recommendation H.323 (ITU-T: International Telecommunication Union —Telecommunications Standardization Sector) and Direct Media Connection (DMC) can transmit communications payload data directly between said IP terminals, bypassing the gateways and thereby avoid additional conversions and delays. However, this is only possible if both IP terminals support the same encoding method.

SUMMARY OF INVENTION

An object of the present invention is to describe a more flexible method for setting up a payload-data connection between communications devices, in which, in particular, it is not necessary for the communications devices to support mutually compatible encoding methods. A further object of the invention is to describe a server device and a converting device for implementing said method.

This object is achieved in a method comprising the features according to a independent claim 1, in a server device and in a converting device. Advantageous embodiments and further developments of the invention are indicated in dependent claims.

In the method according to the invention, in order to transmit payload data from a source communications device which is provided with a first encoder for encoding the payload data to a target communications device which is provided with a first decoder for decoding the payload data, transmission taking place via a communications network which is provided with several converting devices comprising additional encoders and decoders, for each of the converting devices verification is carried out as to whether the first encoder is compatible with a decoder of a respective converting device and the first decoder is compatible with an encoder of this respective converting device. The communications devices can be implemented, for example, as IP terminals, IP telephones and multimedia applications, but can also be implemented as gateways and routers. The converting devices can be, in particular, network gateway devices such as gateways, connection controls such as gatekeepers and network elements such as routers. An encoder can preferably be an encoding portion of a codec and a decoder a decoding portion of a codec.

An encoder and a decoder are deemed compatible with one another if a data stream encoded by the encoder can be decoded—possibly with losses of quality—by the decoder. An encoder or decoder can furthermore comprise a codec and additional parameters for configuring the codec.

In the case of a converting device, compatibility is ascertained in particular where the first encoder is compatible with one of the decoders of a converting device and one of the encoders of this converting device is compatible with the first decoder.

Furthermore, in the inventive method for the transmission of payload data, one of the converting devices deemed to be compatible, in which verification ascertains compatibility, is selected from the converting devices, the selected converting device decoding the payload data encoded with the first encoder with the compatible decoder of the selected converting device and encoding the payload data decodable with the first decoder with the compatible encoder of the selected converting device.

The method according to the invention is advantageous to the extent that, where the verification ascertains compatibility, a payload data connection can be set up from the source communications device to the target communications device via a single converting device and consequently only minor losses of quality occur in the quality of the payload data. The method can advantageously be used where a direct payload-data connection is not possible, in particular due to incompatible encoders and decoders between the source communications device and the target communications device, or where this is possible only with an encoder and decoder not suited to an available bandwidth.

The method according to the invention can be executed in particular centrally in a server device, in a converting device or locally in several converting devices.

The inventive server device for controlling the method according to the invention comprises a verification unit, a converting-device selection unit and an encoder/decoder selection unit. The verification unit serves to verify compatibility of the first encoder with a decoder of one of the converting devices respectively and of the first decoder with an encoder of this respective converting device. For transmitting the payload data, one of the converting devices in which verification ascertains compatibility is selected from the converting devices by the converting-device selection unit. Furthermore, in the inventive server device, the encoder/decoder selection unit is provided for selecting a decoder compatible with the first encoder and an encoder of the selected converting device compatible with the first decoder for decoding the payload data encoded with the first encoder and for encoding the payload data decodable with the first decoder.

The converting device according to the invention for transmitting payload data from the source communications device to the target communications device comprises an encoder/decoder determination unit for recording an encoding indicator specifying the first encoder and a decoding indicator specifying the first decoder. This encoding and/or decoding indicator can be determined e.g. from a signaling message traffic, from a configuration of the converting device and/or from a registration of the communications devices with the converting device. The converting device according to the invention comprises furthermore a receiving unit for receiving an initiation message from a further converting device and/or for receiving a signaling message, e.g. a connection set-up message, from the source communications device and for activating a verification device upon receipt of the initiation message and/or the signaling message. The converting device according to the invention also has a sending unit for dispatching an initiation message to a further converting device, particularly in the event of a negative verification result from the verification device. The converting device comprises furthermore a verification device for verifying with the aid of the recorded encoding and decoding indicators whether the first encoder is compatible with a decoder of the converting device and the first decoder is compatible with an encoder of the converting device. The inventive converting device also comprises a transmission unit for transmitting the payload data from the source communications device to the target communications device if the verification result is positive, in the transmission unit the payload data encoded with the first encoder being decoded with a compatible decoder of the converting device and the payload data decodable with the first decoder being encoded with a compatible encoder of the converting device.

The payload data can preferably be transmitted directly from the source communications device to the converting device without further converting devices being located in the transmission path of the payload data. The same applies to transmission from the converting device to the target communications device. In this way, losses of quality due to multiple conversions of the payload data can be avoided.

In an advantageous further development of the inventive method, one or more of the non-selected converting devices that are located in the signaling path between the source communications device and the target communications device can be bypassed in the transmission of the payload data. Losses of quality of the payload data through multiple encoding and decoding or due to delays caused by multiple buffering of the payload data in jitter buffers can thus be avoided. This applies in particular where the payload data is transmitted exclusively via the selected converting device, bypassing the non-selected converting devices, and consequently only a single converting device is involved in the transmission of the payload data.

In an advantageous embodiment of the inventive method, as part of the verification of compatibility an encoding indicator specifying the first encoder, a decoding indicator specifying the first decoder, a converter-encoding indicator specifying the encoder(s) of the converting device to be verified in each case and/or a converter-decoding indicator specifying the decoder(s) of the same converting device can be recorded.

Such recording can be carried out, in particular, by analyzing a message, preferably a signaling message as part of setting up a connection, by configuring a converting device or a server or by registering the communications devices with a converting device or a server.

This recording simplifies the verification of compatibility, as compatibility can be ascertained only by a simple comparison of the data specified previously. This can be carried out in particular by comparing the encoding indicator with the converter-decoding indicator and the decoding indicator with the converter-encoding indicator.

In a further advantageous embodiment of the invention, one of the converting devices can record the encoding indicator and the decoding indicator of the communications devices and verify with the aid of the recorded encoding indicator and the recorded decoding indicator whether the first encoder is compatible with a decoder of this converting device and the first decoder is compatible with an encoder of this converting device. The verification of compatibility is thereby simplified as the converting device implementing the method does not record the encoders and decoders of the other converting devices and does not carry out any verification in respect of these converting devices.

This converting device that is carrying out the verification can advantageously inform an additional converting device, provided the verification yields a negative verification result, in order that the other converting device likewise carries out an inventive method. In an advantageous further development of the inventive method, the converting device verifying compatibility can consequently send a notification information to a further one of the converting devices in order that said further converting device verifies whether the first encoder is compatible with a decoder of the further converter device and whether the first decoder is compatible with an encoder of the further converting device. The notification information can preferably comprise the encoding indicator and the decoding indicator as parameters, so the further converting device does not need to define or determine these indicators afresh.

If the communications devices are linked to one another via a chain of converting devices, then one of these converting devices can preferably implement the inventive method and only if there is a negative verification result, i.e. if an absence of compatibility is established, can a further converting device be informed by means of the notification information in order that this further converting device will likewise carry out an embodiment of the inventive method. This can then be carried out repeatedly by different converting devices until one of the converting devices establishes compatibility. If none of the verifying converting devices establishes compatibility, the payload data can be transmitted via several or all the converting devices. Here, the transmission of payload data can preferably match the path of the signaling messages, said path frequently being predetermined by a configuration of the converting devices. In this way backward compatibility can be ensured in relation to conventional prior art methods in which the payload data is transmitted via several converting devices and an encoding and a decoding of the payload data is carried out in the respective converting devices.

As soon as one of the verifying converting devices detects compatibility, the selection of the converting device can preferably be carried out by this recording and verifying converting device. Consequently, the verifying converting device can select itself in order to transmit the payload data between the source communications device and the target communications device.

In a further advantageous embodiment of the inventive method, the recording of the encoding indicator and/or the decoding indicator can be carried out with the aid of a signaling message, with the aid of the notification information, with the aid of a configuration and/or with the aid of a registration. The signaling message can preferably be a connection set-up message from the source communications device, as well as an acknowledgment message from the target communications device as part of connection signaling. By means of the registration, communications devices can preferably register with a converting device so that this converting device can administer which communications devices are linked directly to the converting device and which codecs the communications devices support. Alternatively or additionally, this data can also be configured in the converting device or requested by means of polling mechanisms.

In an advantageous further development of the inventive method, as part of the selection of the converting device, an evaluation of the first encoder, of the first decoder, of the further encoders and/or of the further decoders can be carried out and an evaluation function formed, with the evaluation function being optimized. This is particularly advantageous if the communications devices support several encoders/decoders and payload data transmission is possible via various of these encoders/decoders, but the tying to one respective encoder and/or decoder will have an impact on the service quality, especially the subjective voice quality, a bandwidth needed or a processor loading in the communications devices. By analyzing the evaluation function, it is thus preferably determined which combination of converting device, encoder of this converting device, decoder of this converting device, encoder of the source communications device and/or decoder of the target communications device is advantageous or optimal for a particular communication situation. The evaluation function may return different results if a communications device is a teleworker terminal or an IP telephone in a LAN, as different bandwidths are available for the communications devices in these two scenarios. The evaluation function can preferably contain a quality of service at the source communications device, a quality of service at the target communications device, a bandwidth of respective sub-connections as part of the payload-data transmission, an available bandwidth of the respective sub-connections and/or a hierarchy of the converting devices. Here, the hierarchy of converting devices is understood to mean in particular that there is a logical sequence of converting devices according to which these converting devices are preferably selected; e.g. the preference may lie in the particular converting device which is linked directly to the target communications device.

In a further advantageous embodiment, where as part of the verification of compatibility it is recognized that direct payload-data communication between the communications devices is possible, a direct payload-data connection can be set up between these communications devices, bypassing the converting devices.

BRIEF DESCRIPTION OF THE DRAWINGS

An exemplary embodiment of the invention will be explained in detail below with the aid of the drawings, in which in diagrammatic representation.

DETAILED DESCRIPTION OF INVENTION

FIGS. 1-4 and FIG. 7 represent diagrammatically a communications system comprising a first IP telephone KE1 as a source communications device and a second IP telephone KE2 as a target communications device. The first encoder of the first IP telephone KE1 is one of the codecs CODEC_A, CODEC_B1 and CODEC_C. The first decoder of the second IP telephone KE2 is one of the codecs CODEC_J2 and CODEC_K. Here, a designation "CODEC_B1" is intended to signify that this codec is compatible with a CODEC_B2, CODEC_B3, etc., but not with a CODEC_A or CODEC_C. CODEC_B1, CODEC_B2, CODEC_B3, etc. are thus mutually compatible codecs based on a codec CODEC_B. If in the exemplary embodiment two devices support the same codec, e.g. CODEC_D, then this means that both use the same codec for encoding and decoding. This means that the encoder of a codec and the decoder of a codec are matched to one another and are thus in particular also compatible. It is assumed that the codecs in the exemplary embodiment are all symmetrical, i.e. a decoder of a codec can decode the data encoded by an encoder of this codec.

The first IP telephone KE1 is linked in a packet-oriented manner via a local area network LAN to a first gateway GW1 as converting device. The first gateway GW1 supports the codecs CODEC_B2, CODEC_D, CODEC_E and CODEC_K and is linked via the local area network LAN, in particular in a packet-oriented manner, to a second gateway GW2 as converting device and a third gateway GW3 as converting device. The third gateway GW3 supports the codecs CODEC_D, CODEC_E, CODEC_G, CODEC_H1 and CODEC_I, while the second gateway GW2 supports the codecs CODEC_H2, CODEC_J1 and CODEC_E. The second gateway is, in addition, linked in a packet-oriented manner via the local area network LAN to the second IP telephone KE2. Alternatively, the linking of the gateways GW1,GW2, GW3 can also be implemented in a circuit-switched manner. The local area network LAN usually has a structure of subnetworks (not shown).

It is assumed that the link between the first IP telephone KE1 and the first gateway GW1 came about on the basis of a registration of the first IP telephone KE1 with the first gateway GW1. Analogously, the second IP telephone KE2 registered with the second gateway GW2. As an alternative to registering, a gateway could also be configured with data of the respective IP telephones or could request the corresponding data from another entity in the network such as a gatekeeper. It is also possible for a gateway to determine all the IP telephones located in its subnetwork by means of polling.

It is assumed that the first and the second IP telephone KE1,KE2 can set up a packet-oriented connection to each of the gateways GW1,GW2,GW3 directly without involving a further converting device. The gateways GW1,GW2,GW3 can also be provided respectively for a gateway to a circuit-oriented communications system (not shown). It is assumed furthermore that the first gateway GW1 is configured such that a connection to a communications partner not known to the first gateway GW1 is forwarded to the third gateway GW3. This third gateway GW3 can verify whether the communications partner is known to it and, if the result of the verification is negative, routes the connection to the second gateway GW2. In this way, the gateways GW1,GW2,GW3 are arranged logically in a chain or according to a hierarchy.

Signaling messages M as part of setting up a connection are illustrated in FIGS. 1-4 by short arrows, the signaling path SIG being represented by a dotted line. As message parameters, codec-describing indicators are indicated in parentheses in relation to the signaling messages M. For reasons of clarity, only the character string after the underscore character in the codec names is indicated, i.e. B1 for CODEC_B1 or J for CODEC_J. One of the codec-describing indicators (A,B1, C, . . . ) may be respectively an encoding indicator specifying the first encoder, a decoding indicator specifying the first decoder, a converter-encoding indicator specifying the encoders of the gateways GW1,GW2,GW3 or a converter-decoding indicator specifying the decoders of the gateways GW1,GW2,GW3 as per claim 2 or claim 13.

Payload-data connections NV_C, NV_J, NV_B, NV_K are represented by dot-dashed lines. The character string which follows the characters "NV_" signifies here which codec has been selected for the respective payload-data connection (i.e. NV_C is encoded and decoded with CODEC_C, NV_J with the mutually compatible codecs CODEC_J1 and CODEC_J2).

Figure 1:
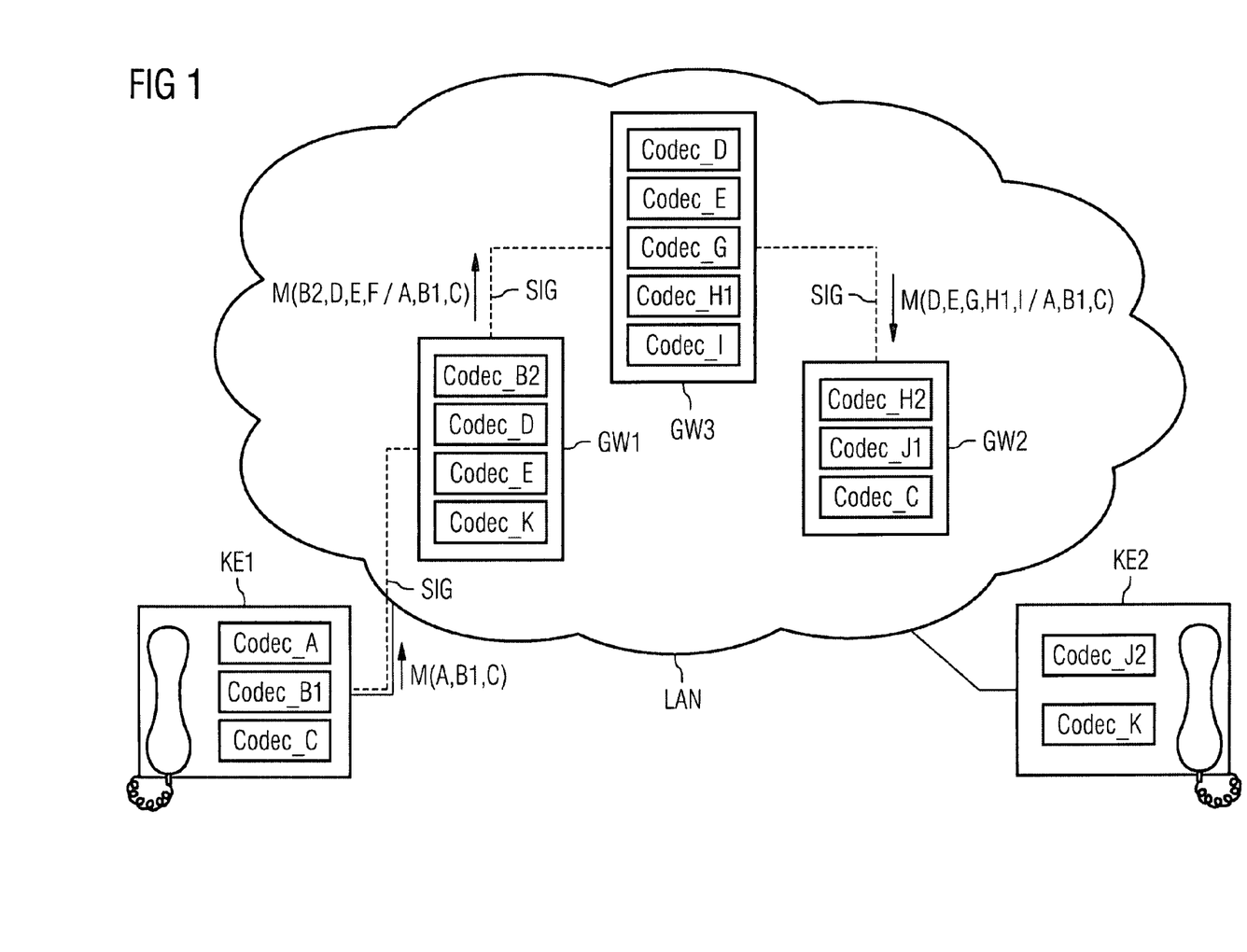
FIGS. 1-4 show a communications system comprising two IP telephones linked to one another via converting devices.

FIG. 1 illustrates the signaling SIG involved in setting up a connection outgoing from the first IP telephone KE1. In a signaling message M comprising the codec-describing indicators A,B1,C for codecs CODEC_A, CODEC_B1, CODEC_C as parameters, it reports the initiation of a payload-data connection to the gateway GW1 assigned to it and informs the gateway GW1 that the three specified codecs for encoding are available to the first IP telephone KE1 for the encoding and/or decoding of payload data.

In the exemplary embodiment, it is assumed that the gateway located last in the chain of gateways GW1,GW2,GW3, i.e. the second gateway GW2, implements an embodiment of the inventive method first. This is advantageous insofar as this second gateway GW2 knows the codecs supported by the second IP telephone KE2 based on the registration of the second IP telephone KE2 or on account of previous signaling and consequently, when a message comprising the codecs supported by the first IP telephone KE1 is received, all the data needed for carrying out a verification of the compatibility of encoders and decoders is available.

The message M received by the first gateway GW1 is therefore used in the first gateway GW1 only for reading out and/or for determining from the message M the codecs supported by the first IP telephone KE1 and for transmitting, including the codecs supported by the first gateway GW1, to the next gateway lying in the chain, i.e. the third gateway GW3. Consequently, the first gateway GW1 transmits a message M containing the codec-describing indicators B2,D,E,F for the codecs of the first gateway GW1 and the codec-describing indicators A,B1,C for the codecs of the first IP telephone KE1. Analogously, the third gateway GW3 now transmits the codec-describing indicators D,E,G,H1,I for its own supported codecs and the codec-describing indicators A,B1,C for the codecs supported by the first IP telephone KE1 to the second gateway GW2.

The second gateway GW2 recognizes, in particular by comparing with its database, that the second IP telephone KE2 is linked to the second gateway GW2 and determines from its database which codecs the second IP telephone KE2 supports. Furthermore, the second gateway GW2 records which codecs it supports itself and verifies whether one of the codecs CODEC_A, CODEC_B1 and CODEC_C for encoding in the first IP telephone KE1 is compatible with one of the codecs CODEC_H2, CODEC_J1 and CODEC_C for decoding in the second gateway GW2. This is recognized for CODEC_C, since the first IP telephone KE1 and the second gateway GW2 support this codec. Furthermore, it is now verified whether one of the supported codecs of the second gateway GW2 for encoding is compatible with one of the codecs CODEC_J2 and CODEC_K for decoding in the second IP telephone KE2. This is the codec CODEC_J1, which is compatible with the codec CODEC_J2. This verification of compatibility can be carried out in particular by comparing the codec-describing indicators (A,B1,C,H2, . . . ).

In this way, the gateway GW2 ascertains compatibility of the codecs between first IP telephone KE1 and the second gateway GW2 and between the second gateway GW2 and the second IP telephone KE2 and selects, for transmission of the payload data, itself and the codec CODEC_C on the transmit side for the first IP telephone KE1, the codec CODEC_C on the receive side for the second gateway GW2, the codec CODEC_J1 on the transmit side for the second gateway GW2 and the codec CODEC_J2 on the receive side for the second IP telephone KE2.

The second gateway GW2 now reports (not shown) to the two IP telephones KE1,KE2 the codecs with which they are subsequently to transmit the payload data direct to the second gateway GW2 or to receive it from the second gateway GW2, namely CODEC_C and CODEC_J2 respectively.

Figure 2:
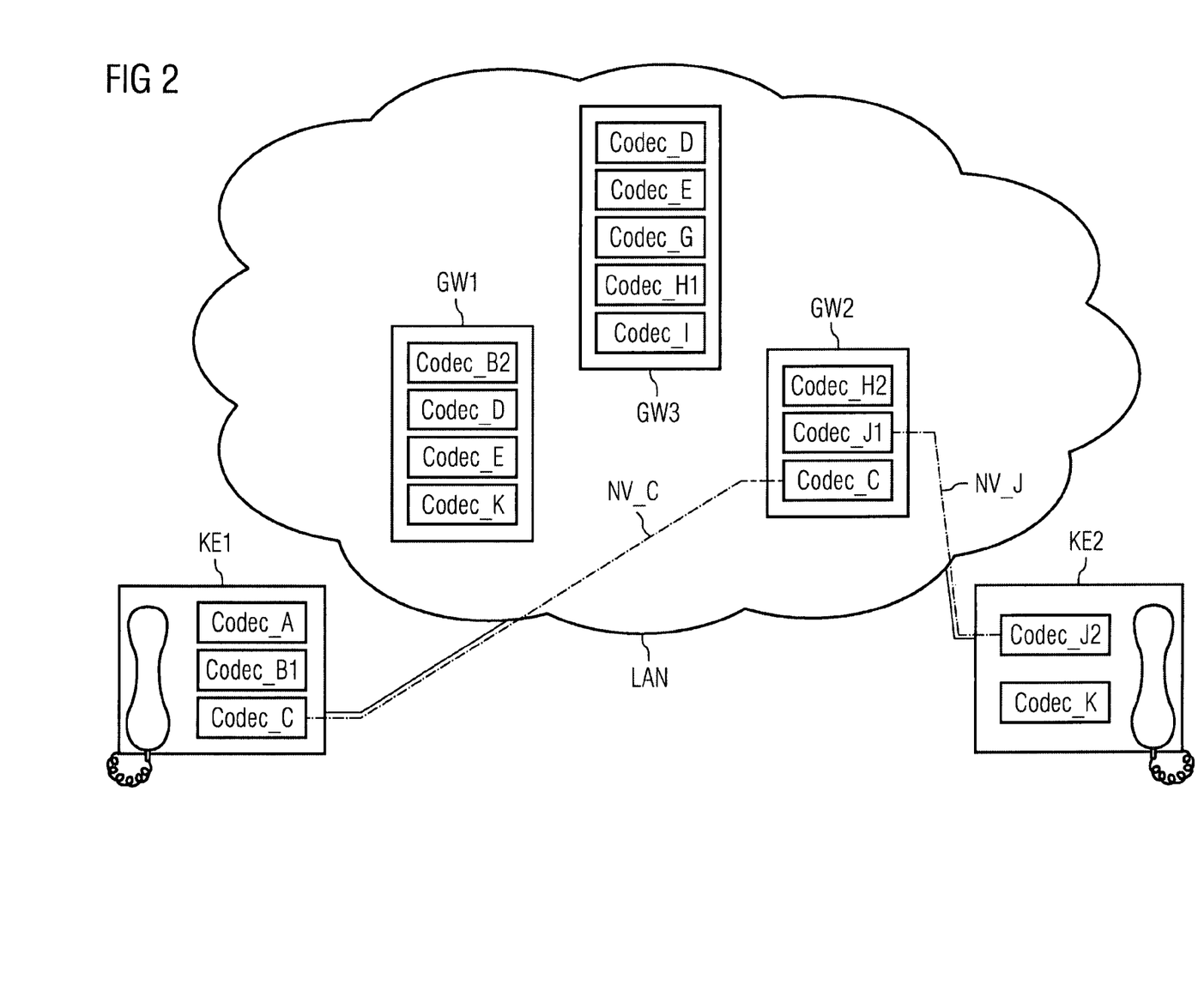

FIG. 2 illustrates the transmission of payload data from the first IP telephone KE1 via the second gateway GW2 to the second IP telephone KE2. The payload-data connection NV_C is set up from the first IP telephone KE1 to the second gateway GW2, the payload data being encoded in the first IP telephone KE1 by means of the codec CODEC_C. On the receive side, the payload data is decoded in the second gateway GW2 with the codec CODEC_C and forwarded to the second IP telephone KE2 via the payload-data connection NV_J, the payload data again being encoded for this purpose, this time with the codec CODEC_J1. The second IP telephone KE2 receives the payload data encoded in this manner and decodes this payload data with the codec CODEC_J2, which is compatible with the codec CODEC_J1.

The payload data is transmitted for example under the RTP protocol (RTP: Real-Time Transport Protocol) or under the SIP protocol (SIP: Session Initiation Protocol) of the IETF working group (IETF: Internet Engineering Task Force). The signaling is transmitted for example under a protocol that conforms to the ITU-T recommendation H.323 or under the SIP protocol.

The packet-oriented connection is through-connected in this way between the first and the second IP telephones KE1, KE2, the payload data being encoded and decoded only in one converting device—the second gateway GW2—and the further converting devices located in the signaling path being bypassed. This is advantageous insofar as only minor losses of quality and also only slight delays occur as a result, since fewer jitter buffers—that of the second gateway GW2 and that of the second IP telephone KE2—are passed through during payload-data transmission.

It is also advantageous that, using the specified method steps, a payload-data connection can be set up between communication terminals, even where the communication terminals do not support any common codecs. In addition, only one gateway needs to be known to the communication terminals in each case and.

It is also advantageous that the method is based solely on the recording of data that is usually easy to determine and that the verification of compatibility is easy to carry out with the aid of this data.

In addition, it is advantageous that, by means of the two payload-data connections NV_C and NV_J for the respective IP telephone KE1,KE2 of said payload-data connections NV_C,NV_J, an optimal codec can be selected for the respective IP telephone KE1,KE2. Thus, for example, an IP telephone can share the available bandwidth with a workstation computer. Consequently, a strongly compressing codec is required for the restricted bandwidth. For an IP telephone in a LAN, on the other hand, a codec that is only slightly compressing can advantageously be selected as a greater bandwidth is available here. Both requirements can be met by the second gateway GW2, as this gateway can select the codecs for the two payload-data connections NV_C,NV_J separately.

Furthermore, for each sub-connection a codec can be selected that is in each case optimized to a bandwidth available in the sub-connection so that, particularly in the case of teleworking or home workstations having a limited bandwidth, e.g. restricted by a narrowband modem connection, high-quality payload data can continue to be provided.

In the case of IP softclients or multimedia applications running on a computer and sharing the processor of the computer with other applications, a codec can also advantageously be selected that is suited to a processor loading.

While the method illustrated diagrammatically in FIGS. 1 and 2 is provided for the transmission of payload data from the first IP telephone KE1 to the second IP telephone KE2, the method can be extended in a simple and analogous manner for bidirectional communication. In particular, the selection of codecs may be valid for both directions of communication. Alternatively, the method can be carried out separately for the two directions of communication such that different codecs can be selected in the two directions of communication.

Figure 3:
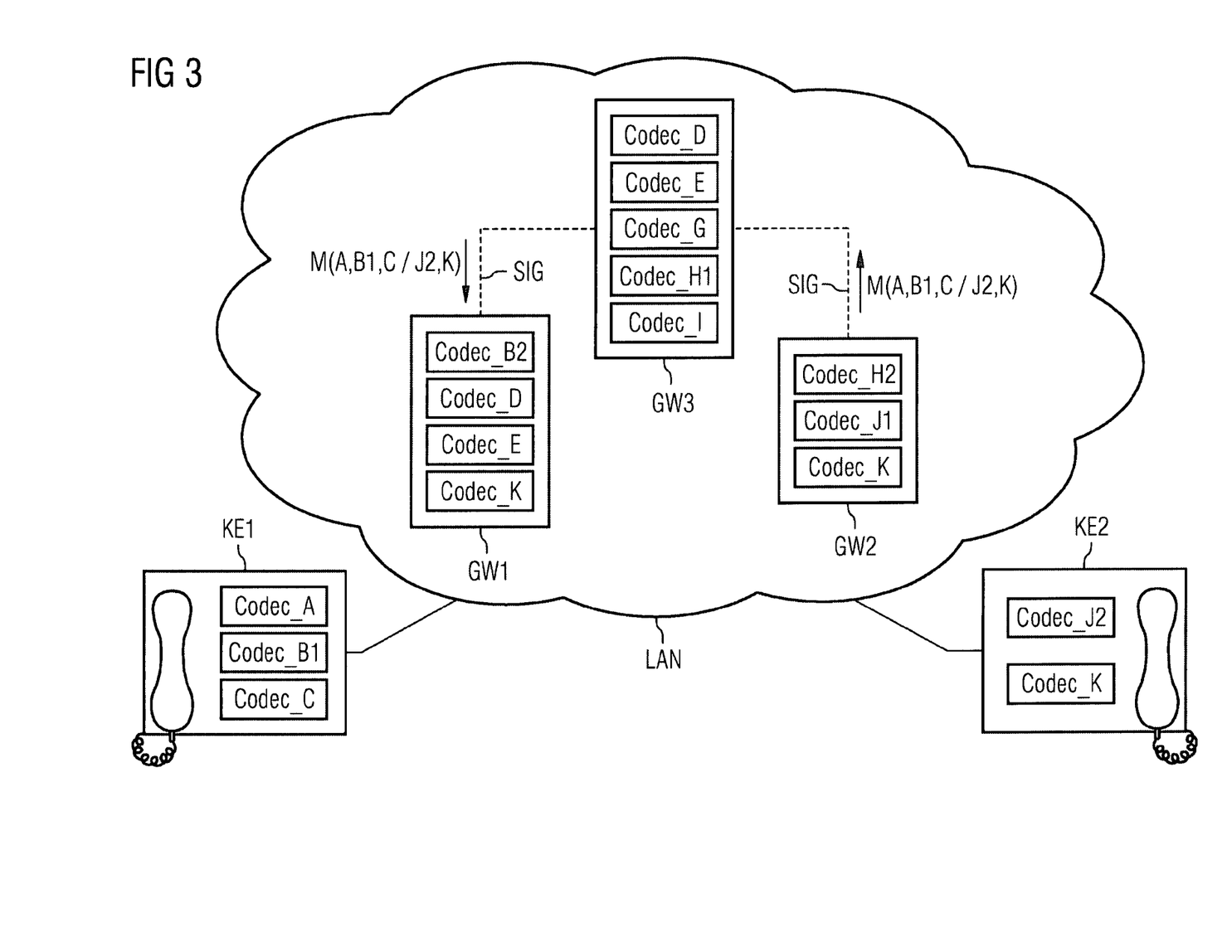

The configuration of the gateways GW1,GW2,GW3 in FIG. 3 differs from the configuration shown in FIGS. 1 and 2 only in that the second gateway GW2 supports a codec CODEC_K in place of the codec CODEC_C. Consequently, the second gateway GW2 has two codecs, namely CODEC_μL and CODEC_K, that are compatible with the codecs CODEC_J2 and CODEC_K of the second IP telephone KE2. On the other hand, however, it has no codec that is compatible with the codecs CODEC_A, CODEC_B1 and CODEC_C of the first IP telephone KE1.

Based on this configuration, signaling SIG is set up in an analogous manner to that shown in FIG. 1, as far as the second gateway GW2 (not shown). In this gateway, after a message has been received as part of the signaling SIG, the method explained previously is executed, the verification of compatibility returning in the second gateway GW2 a negative verification result and in particular detecting no compatibility between the encoders of the codecs CODEC_A, CODEC_B1, CODEC_C of the first IP telephone KE1 and the decoders of the codecs CODEC_H2, CODEC_J1, CODEC_K of the second gateway GW2.

The second gateway GW2 reports in the subsequent signaling message M as notification information and/or as initiation message to the third gateway GW3 that this gateway should also allow an embodiment of the inventive method to run. Furthermore, the codecs supported by the two IP telephones KE1,KE2 are made known to the third gateway GW3 in that the codec-describing indicators A,B1,C,J2,K of the two IP telephones KE1,KE2 are transmitted in the signaling message M. In addition to these codecs, the third gateway GW3 now records its own codecs and checks each individual codec against the codecs of the IP telephones KE1,KE2 in order to ascertain compatibility. In the present exemplary embodiment, neither a codec compatible with the first IP telephone KE1 nor a codec compatible with the second IP telephone KE2 can be found.

On the basis of this negative test result, the third gateway GW3 transmits, as illustrated in FIG. 3, a further signaling message M as notification information with the codecs of the two IP telephones KE1,KE2 as parameters to the first gateway GW1. An embodiment of the inventive method is then executed in the first gateway GW1.

The first gateway GW1 then records its own codecs and the codecs of the two IP telephones KE1,KE2 and checks or compares these in pairs. In the process, the first gateway GW1 detects compatibility between the codec CODEC_B1 of the first IP telephone KE1 for encoding the payload data and the codec CODEC_B2 of the first gateway GW1 for decoding the payload data encoded in this way. Furthermore it detects compatibility between the codec CODEC_K of the first gateway GW1 for encoding the payload data and the codec CODEC_K of the second IP telephone KE2 for decoding the payload data encoded in this way.

The first gateway GW1 consequently ascertains compatibility of the codecs and selects itself as the gateway for the transmission of payload data and informs the two IP telephones KE1,KE2 about this, preferably via confirmation messages as part of the signaling (not shown).

Figure 4:
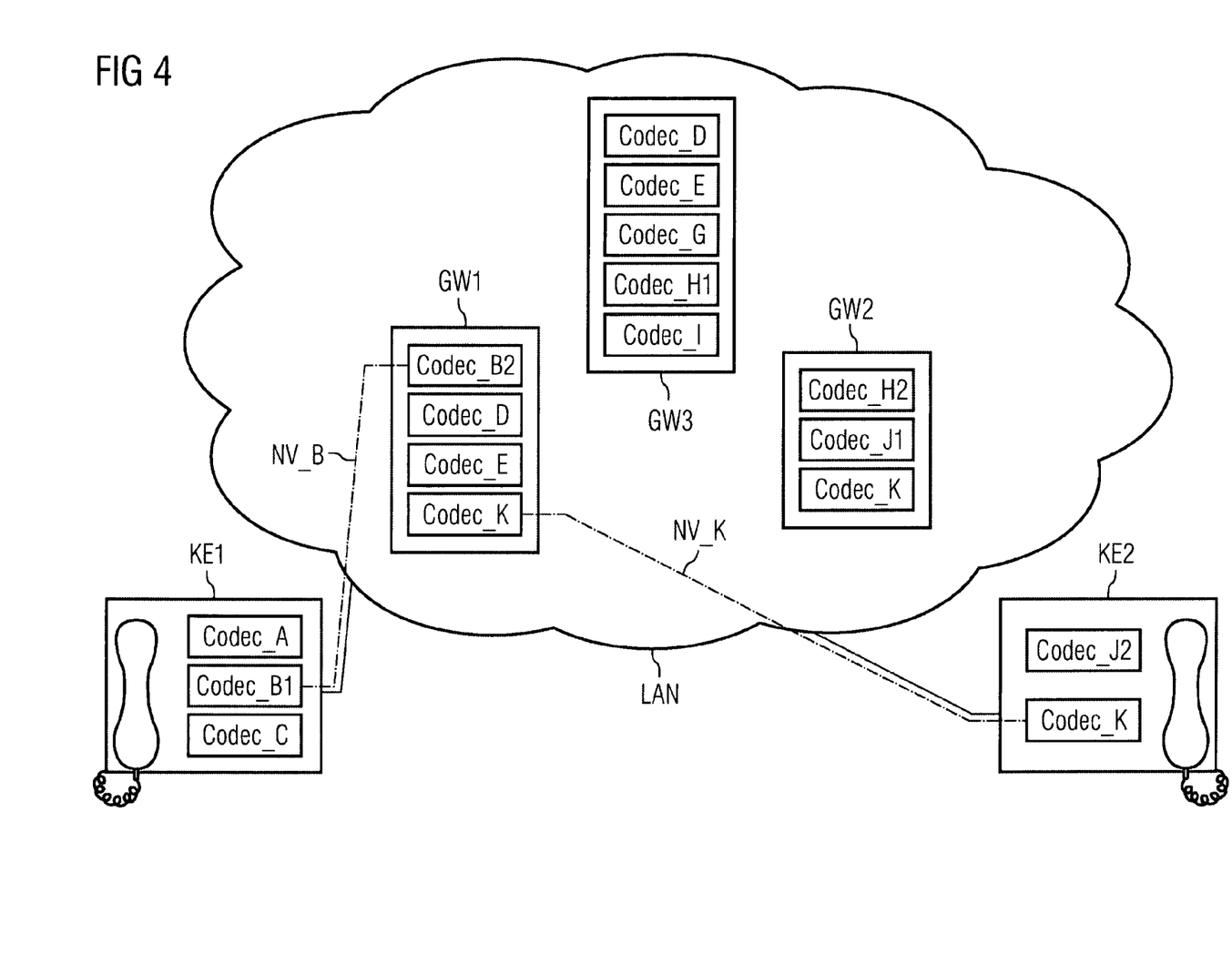

Subsequently, FIG. 4 illustrates—analogously to FIG. 2—the transmission of payload data from the first IP telephone KE1 via the first gateway GW1 to the second IP telephone KE2, bypassing the second and third gateways GW2, GW3. The payload-data connection NV_B is set up from the first IP telephone KE1 to the first gateway GW1, the payload data being encoded in the first IP telephone KE1 by means of the codec CODEC_B1. On the receive side, the payload data is decoded in the first gateway GW1 with the codec CODEC_B2, which is compatible with the codec CODEC_B1, and is forwarded to the second IP telephone KE2 via the payload-data connection NV_K, the payload data again being encoded for this purpose, this time with the codec CODEC_K. The second IP telephone KE2 receives the payload data encoded in this manner and decodes said payload data with its codec CODEC_K. The packet-oriented connection between the first and the second IP telephones KE1,KE2 is through-connected in this way, the payload data again being decoded and encoded only in one of the converting devices, and the other converting devices located in the signaling path being bypassed.

The method is advantageous insofar as the gateways GW1, GW2,GW3 reciprocally inform one another whether one of the gateways has to execute the inventive method. In this way, a communications device needs to know only one of the gateways and also to communicate the initiation of the connection set-up only to this gateway.

Figure 5:
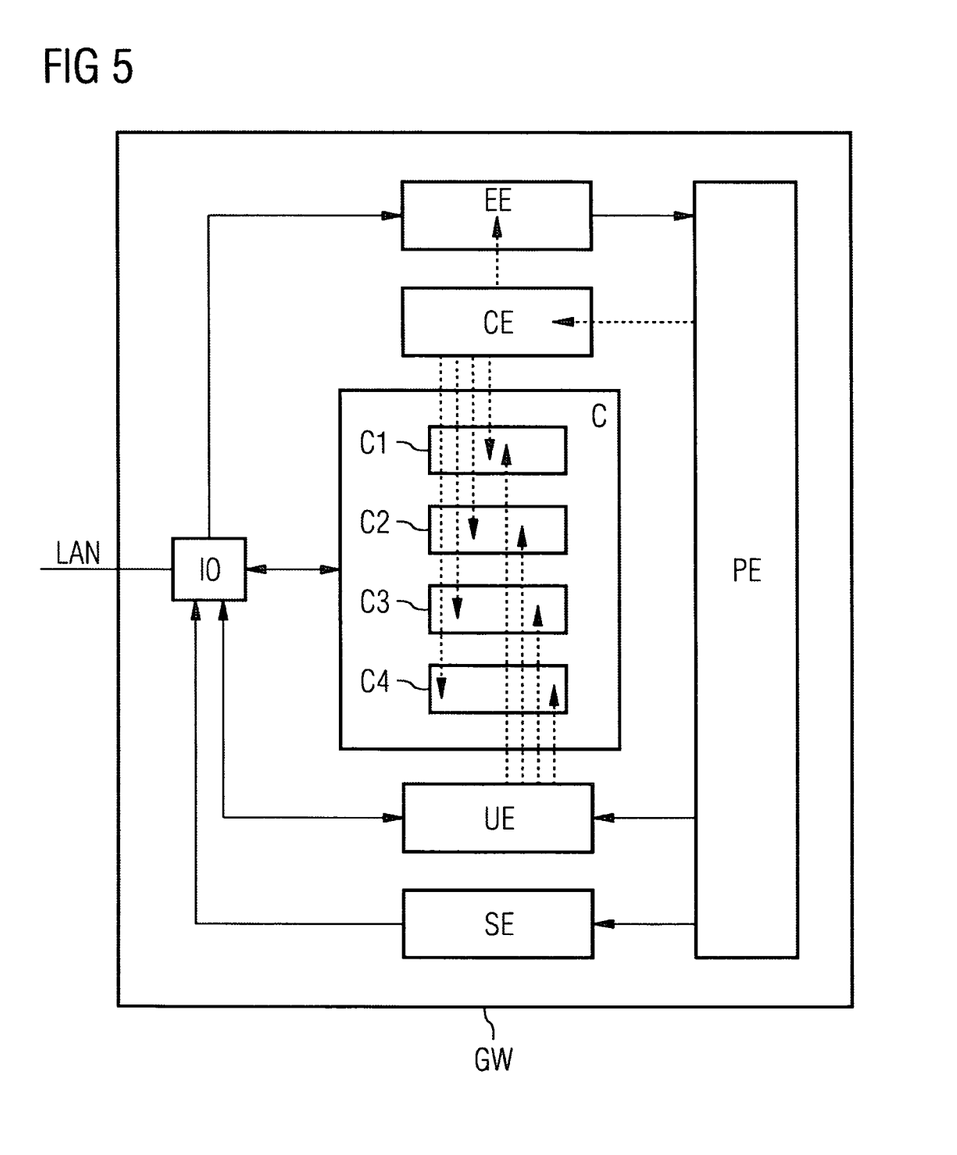
FIG. 5 shows a converting device according to the invention.

FIG. 5 shows schematically a gateway GW as converting device for implementing an embodiment of the inventive method. The gateway GW is in this case linked to a local area network LAN via which messages from and/or to the communications devices and other converting devices are transmitted. This transmitting and/or this receiving of the messages, particularly in relation to the transmission of signaling and payload data, takes place via an input/output unit IO.

The input/output unit IO and further components of the gateway GW are represented in FIG. 5 as rectangles. Components which exchange data with one another are connected to one another via a dashed arrow. A component which calls up a further component and possibly also transmits data in this context, displays a continuous arrow from said component to said further component.

The input/output unit IO of the gateway GW can transmit payload data to the codecs C, consisting of a codec C1, a codec C2, a codec C3 and a codec C4, for encoding and decoding the payload data and forward the payload data processed in this manner to the local area network LAN. Furthermore, the input/output unit IO has interfaces to a receiving unit EE, a transmission unit ÜE and a sending unit SE.

Besides the input/output unit IO, the gateway GW comprises the receiving unit EE for receiving an initiation message from a further converting device, for example a message from the second gateway GW2 to the third gateway GW3 as shown in FIGS. 1-4 and/or for receiving a signaling message, in particular a connection setup message from a source communications device—in particular of the first IP telephone KE1 as shown in FIGS. 1-4, and for activating a verification device PE upon receipt of the initiation message and/or the signaling message.

Furthermore, the gateway GW comprises an encoder/decoder determining unit CE for recording an encoding indicator specifying the first encoder of the source communications device and a decoding indicator specifying the first decoder of the target communications device. The encoder/decoder determining unit CE requests from the receiving unit EE the encoding/decoding indicators specifying parameters of the received messages, determines the encoding/decoding indicators on the basis of a configuration which has been carried out of the gateway GW or on the basis of a registration of a communications device with the gateway GW which has been carried out. The encoder/decoder determining unit CE also determines the encoders and/or decoders supported by the gateway GW through configuration, detection of the codecs C available or by requesting the codecs C.

The gateway GW additionally comprises the verification device PE for verifying whether the first encoder is compatible with a decoder of the codecs C of the gateway GW and the first decoder is compatible with an encoder of the codecs C of the gateway GW. The verification device PE requests the recorded encoding and decoding indicators from the encoder/decoder determining unit CE.

If the verification device PE ascertains compatibility, it activates the transmission unit ÜE to transmit the payload data from the source to the target communications device. The transmission unit ÜE then sends to the communications devices signaling messages that the payload data will subsequently be sent via the gateway GW and transmits codec information—e.g. codec-describing indicators—of the selected codecs of the gateway GW to the communications devices.

To transmit the payload data, the transmission unit ÜE can access the codecs C and decode the payload data received—at a later time—via the input/output unit IO and encode the payload data to be sent. In the transmission unit ÜE, by accessing the codecs C, the payload data encoded with the first encoder is decoded with a compatible decoder of the codecs C of the gateway GW and the payload data decodable with the first decoder is encoded with a compatible encoder of the codecs C of the gateway GW.

If the verification device PE does not ascertain compatibility, it activates the sending unit SE which dispatches via the input/output unit IO an initiation message to a further converting device in order that the further converting device be informed that the gateway GW carrying out the verification has returned a negative verification result and one of the further gateways should also carry out a compatibility verification. The sending unit SE preferably transmits in the initiation message the encoding and decoding indicators of the communications devices determined in the encoder/decoder determination unit CE.

Figure 6:
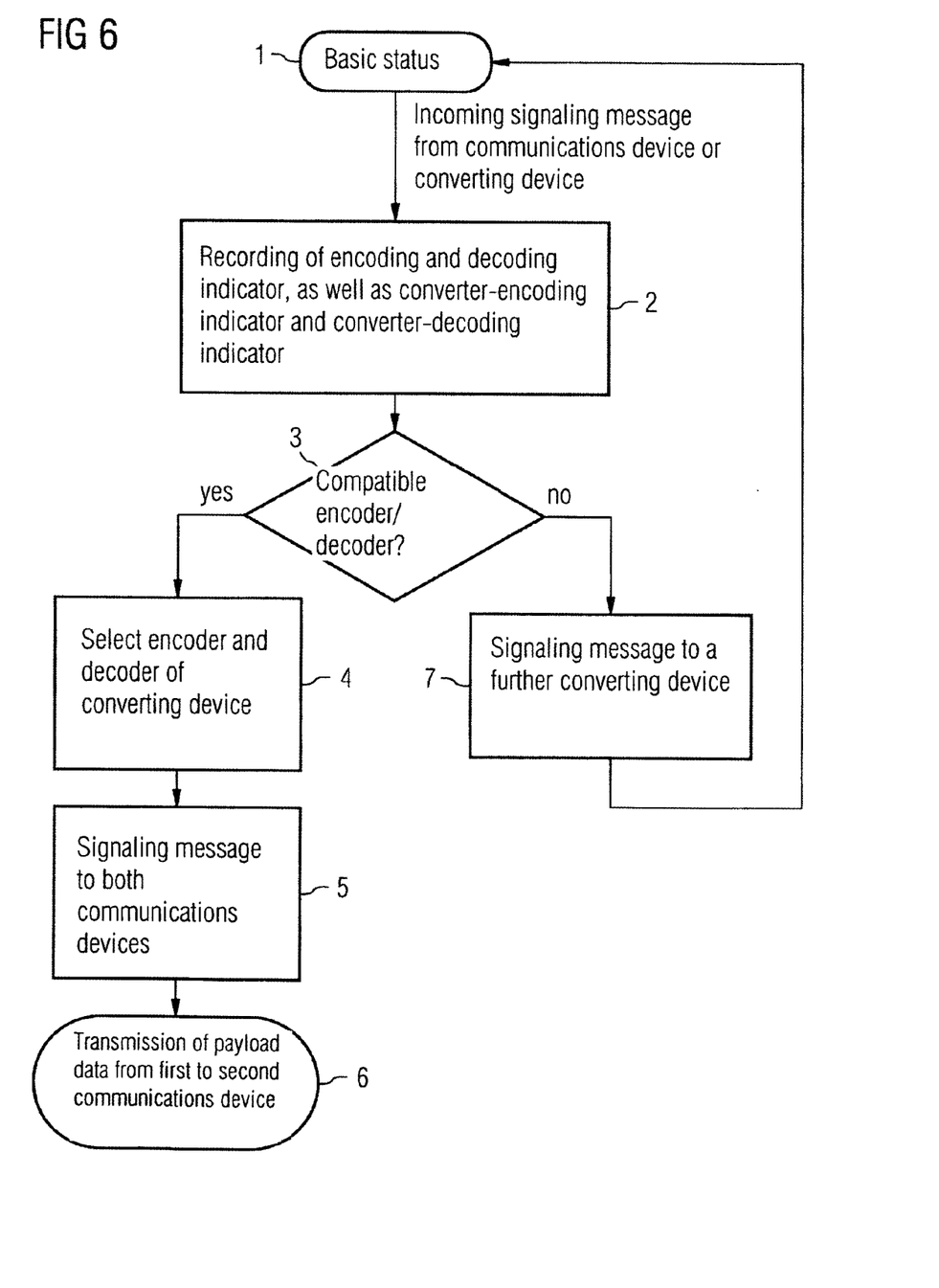
FIG. 6 shows a flow diagram of the inventive method operating in one of the converting devices.

FIG. 6 represents a flow diagram which is designed to illustrate the interaction of the previously mentioned gateway components. Starting from a basic status 1 of the gateway GW, an incoming signaling message from a communications device or a further gateway causes the input/output unit IO to forward this information to the receiving unit EE and there an action 2 to be executed in the encoder/decoder determining unit CE. Action 2 is in this case the recording of encoding and decoding indicator of the communications devices and of converter encoding indicator and decoding indicator of the gateway GW. In a request 3, the verification unit PE carries out the compatibility verification of encoder-decoder pairs. If no compatibility is ascertained between encoders/decoders of the communications devices and the decoders/encoders of the gateway GW, the action 7, the dispatch of a signaling message, in particular of an initiation message, to a further converting device is executed. The gateway GW then returns to the basic status 1.

If the verification result in the verification unit PE is positive, the positively verified encoder of the codec C of the gateway GW and the positively verified decoder of the codecs C of the gateway GW are selected—action 4—and a signaling message, e.g. an acknowledgment message as part of the connection setup signaling, is transmitted to the two communications devices—action 5.

The gateway GW can then switch to status 6 for transmitting payload data between the two communications devices, the selected encoders and decoders being used for encoding and decoding the payload data respectively.

Figure 7:
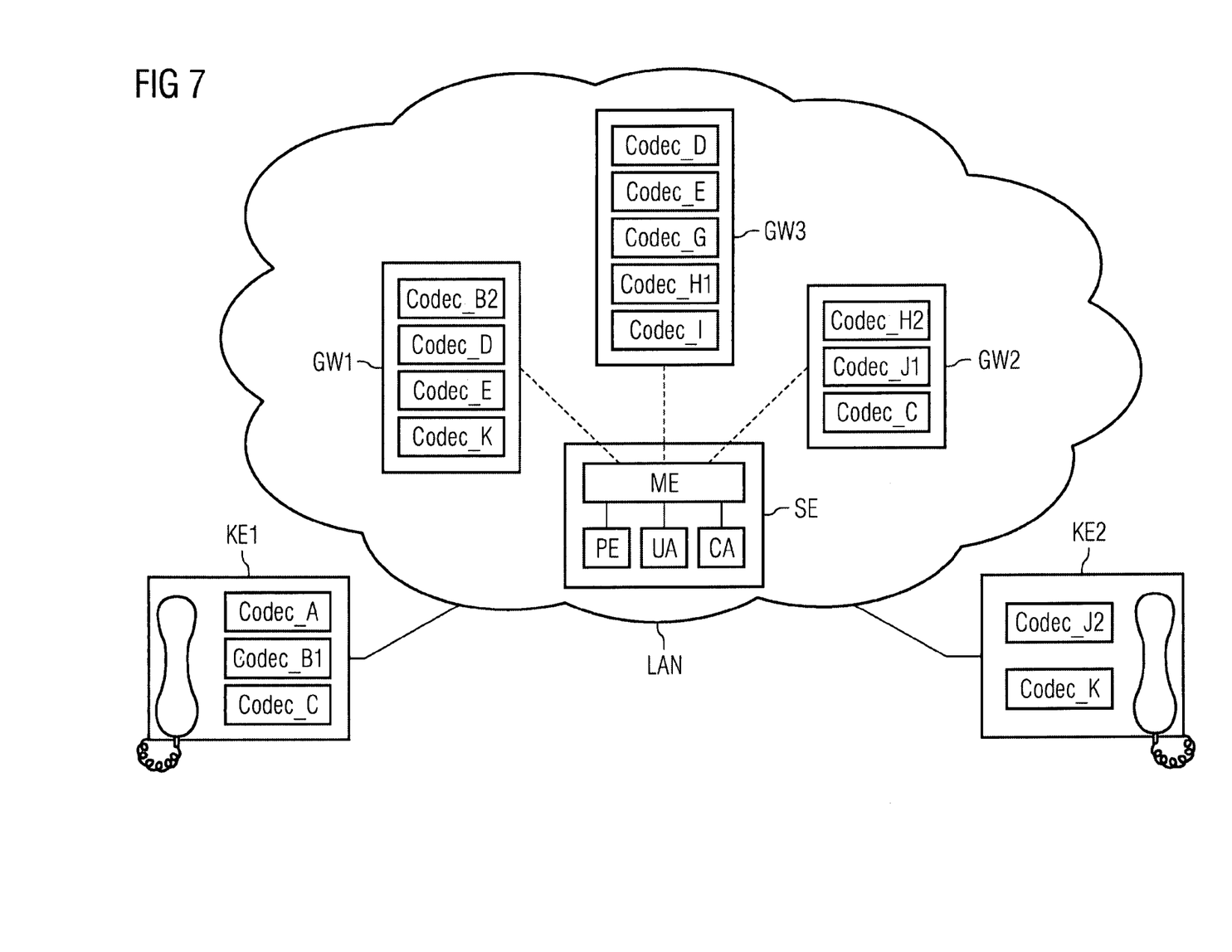
FIG. 7 shows a communications system comprising two IP telephones, linked to one another via converting devices, and a server device according to the invention.

FIG. 7 represents diagrammatically a communications system analogous to that shown in FIGS. 1-4, a version of the inventive method being executed in a server device SE. The logic connections between the gateways GW1,GW2,GW3 and a message unit ME of the server device SE are represented by a dashed line. Such a logic connection may be based on a packet-oriented or a circuit-oriented protocol. In particular, via said link, messages for controlling the gateways GW1, GW2,GW3 are transmitted to said gateways and information messages received from said gateways.

The communications system represented in FIG. 7 and the configuration of the IP telephones KE1,KE2 and of the gateways GW1,GW2,GW3 otherwise corresponds to the configuration shown in FIG. 1.

The server device SE comprises besides the message unit ME a verification unit PE, a converting-device selection unit UA and an encoder/decoder selection unit CA. With these components, represented as rectangles, the server device SE can control the method for transmitting payload data from the first IP telephone KE1 which is provided with a first encoder for encoding the payload data to the second IP telephone KE2 which is provided with a first decoder for decoding the payload data, the server device SE carrying out a verification in order to select one of the gateways GW1,GW2,GW3 for transmitting the payload data.

The verification unit PE carries out the said verification of compatibility of the first encoder with a decoder of a respective gateway of the gateways GW1,GW2,GW3 and of the first decoder with an encoder of this respective gateway GW1, GW2,GW3.

If the verification is positive, the converting-device selection unit UA and the encoder/decoder selection unit CA are called up. In the case of a respective verification being negative, the verification unit PE carries out the verification for another of the gateways GW1,GW2,GW3.

The server device SE comprises the converting-device selection unit UA for selecting one of the gateways GW1, GW2,GW3 for which the verification ascertains compatibility—in the present exemplary embodiment, in the case of the codecs given this may be either the second gateway GW2 or the first gateway GW1—from the set of gateways GW1, GW2,GW3 to be verified for the transmission of the payload data.

It is assumed hereinbelow that the first gateway GW1 is selected.

The server device SE also comprises the encoder/decoder selection unit CA for selecting a decoder, in the exemplary embodiment codec CODEC_B2, which is compatible with the first encoder, in the exemplary embodiment codec CODEC_B1, and an encoder, in the exemplary embodiment codec CODEC_K, which is compatible with the first decoder, in the exemplary embodiment also codec CODEC_K, of the selected first gateway GW1 for the decoding of the payload data encoded with the first encoder and for the encoding of the payload data decodable with the first decoder.

Figure 8:
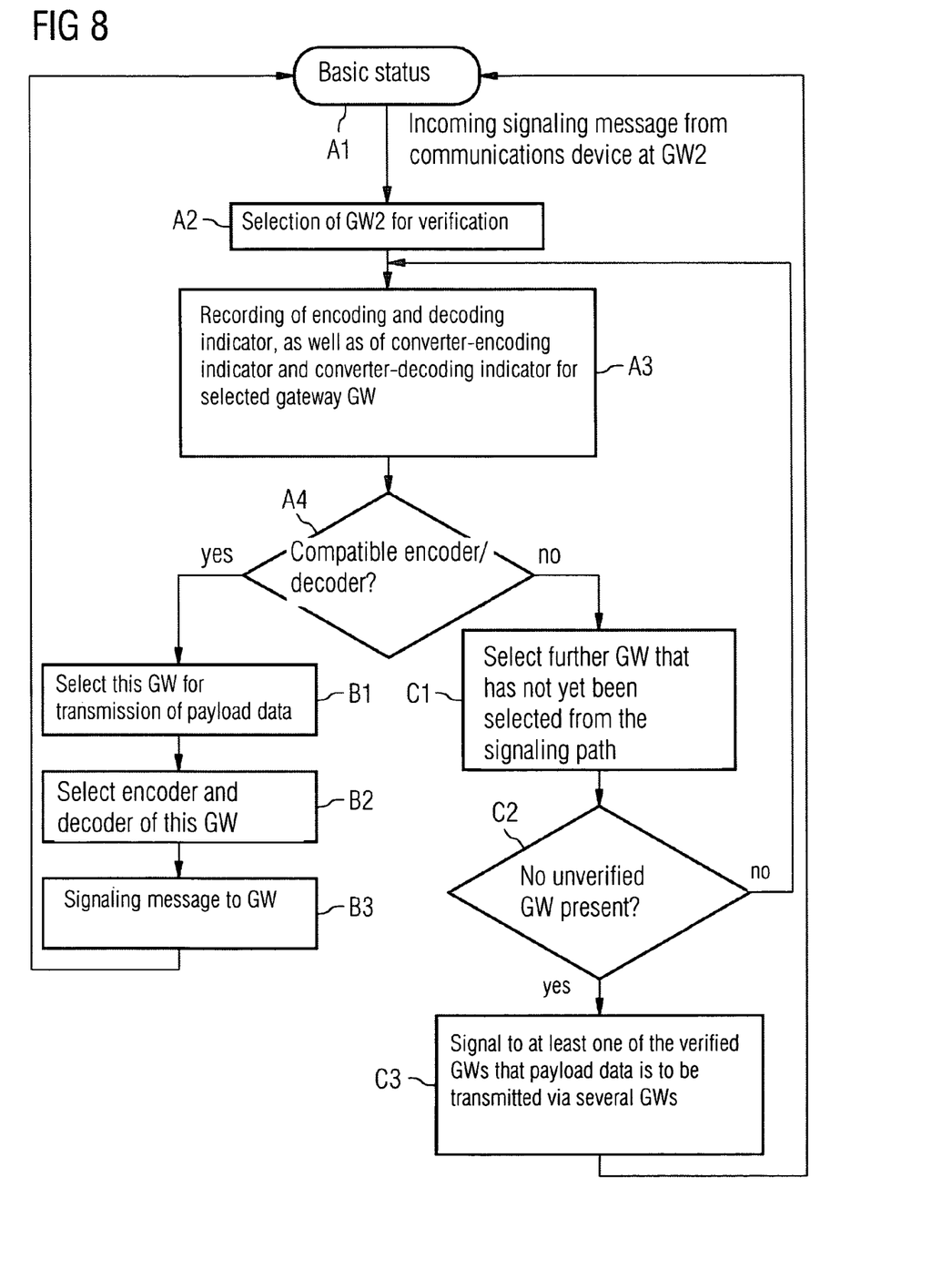
FIG. 8 shows a flow diagram of the inventive method operating in the server device.

A detailed flow of the method in the server device SE is explained in FIG. 8 hereinbelow with the aid of a flow diagram. It is assumed that, as in FIG. 1, a signaling message from the first IP telephone KE1 arrives at the second gateway KE2 as part of the connection set-up. On the basis of this, the second gateway GW2 sends a message to the server device SE which as a result departs from its basic status A1 and executes the action A2 in which the second gateway GW2 is selected for a verification of compatibility that follows later.

By means of an action A3, the encoding and decoding indicators of the two IP telephones KE1,KE2 and of the selected second gateway GW2 are now recorded. Following that, it is verified in the verification unit PE by means of a request A4 whether compatibility exists between the codecs recorded. This is the case if the codec CODEC_C is selected as first encoder in the first IP telephone KE1, the codec CODEC_C is selected as decoder of the second gateway GW2, the codec CODEC_J1 as encoder of the second gateway GW2 and the codec CODEC_J2 as decoder of the second IP telephone KE2.

In this way, the verification unit PE recognizes compatibility and the server device SE then executes the action B1, whereby it selects the second gateway GW2 for transmitting the payload data, selects the codecs CODEC_C and CODEC_J1 of the second gateway GW2 (action B2) and signals this at least to the second gateway GW2 (action 3). This brings the method in the server device SE to a close, and the server device returns to the basic status A1.

The second gateway can then (not shown) send messages to the two IP telephones KE1,KE2 in order to notify these that the payload data is to be transmitted via the second gateway GW2 and which codecs are to be used by the IP telephones KE1,KE2 respectively.

If the verification unit PE had not ascertained compatibility for the second gateway GW2 examined, the method would have been continued with an action C1 in which a further, as yet unverified gateway from the signaling path is selected—in the present exemplary embodiment the first or the third gateway GW1,GW3.

If it is ascertained by means of a subsequent verification C2 that previously unverified gateways are present, one of these gateways is selected randomly or according to a defined selection method. The inventive method is then continued recursively with the action A3.

If it is ascertained by means of the verification C2 that all the gateways GW1,GW2,GW3 have been verified and compatibility of the codecs has not been detected in any of these verifications, the method operating in the server device is terminated by an action C3 such that the payload data is transmitted via all the gateways located in the signaling path, in the present exemplary embodiment the first, the second and the third gateways GW1,GW2,GW3. Information displaying this fact is transmitted from the server device SE to at least one of the gateways GW1,GW2,GW3.

The inventive method is thereby terminated in the server device SE. The server device SE can consequently return to its basic status A1.

The invention claimed is:

1. A method for transmitting payload data from a source communications device with a first encoder for encoding the payload data via a first codec to a target communications device with a first decoder for decoding the payload data in a second codec that differs from the first codec and is incompatible with the first codec, the method comprising:

transmitting the payload data via a communications network having a plurality of converting devices, each of the converting devices having a plurality of second encoders and second decoders, the converting devices comprising a first converting device and a second converting device;

verifying for at least one of the converting devices located in a signaling path for setting up a connection between the source communications device and the target communications device whether the first encoder is compatible with one of the second decoders of the first converting device and whether one of the second encoders of the first converting device is compatible with the first decoder of the target communications device, the first and second converting devices being within the signaling path;

upon a determination that one of the second decoders of the first converting device is compatible with the first encoder of the source communications device and that one of the second encoders of the first converting device is compatible with the first decoder of the target communications device, selecting the first converting device for transmission of the payload data;

upon the selection of the first converting device, the first converting device decoding the payload data encoded with the first encoder with the second decoder of the first converting device that is compatible with the first encoder and the first converting device encoding the received and decoded payload data with the second encoder of the first converting device that is compatible with the first decoder of the target communications device for sending the payload data to the target communications device;

upon a determination that none of the second decoders of the first converting device is compatible with the first encoder of the source communications device or that none of the second encoders of the first converting device is compatible with the first decoder of the target communications device, verifying whether the first encoder is compatible with one of the second decoders of the second converting device and whether one of the second encoders of the second converting device is compatible with the first decoder of the target communications device;

upon a determination that one of the second decoders of the second converting device is compatible with the first encoder of the source communications device and that one of the second encoders of the second converting device is compatible with the first decoder of the target communications device, selecting the second converting device for transmission of the payload data; and upon the selection of the second converting device, the second converting device decoding the payload data encoded with the first encoder with the second decoder of the second converting device that is compatible with the first encoder and the second converting device encoding the received and decoded payload data with the second encoder of the second converting device that is compatible with the first decoder of the target communications device for sending the payload data to the target communications device.

2. The method of claim 1 wherein signaling between the source communications device and the target communications device during transmission of the payload data is carried out via only the first converting device such that all other non-selected converting devices are bypassed during transmission of the payload data between the source and target communications devices; and wherein the converting devices are comprised of gateways.

3. The method of claim 1 wherein signaling between the source communications device and the target communications device during transmission of the payload data is carried out via only the second converting device such that all other non-selected converting devices are bypassed during transmission of the payload data between the source and target communications devices; and wherein the converting devices are comprised of gateways.

4. The method of claim 1 wherein for verification of compatibility:

an encoding indicator specifying the first codec of the first encoder is included within signaling sent from the source communications device to one of the converting devices to initiate formation of a payload connection for transmitting the payload data to the target communications device and is subsequently recorded;

a decoding indicator specifying the second codec of the first decoder is included within signaling sent from the target communications device and is subsequently recorded; and for each of the converting devices, a converter-encoding indicator specifying a codec for each second encoder of the converting device and a converter-decoding indicator specifying a codec of each second decoder of that converting device is recorded.

5. The method as claimed in claim 4, wherein the first converting device records the encoding indicator and records the decoding indicator and performs the verifying step of the method.

6. The method of claim 4 wherein the recording of the encoding indicator is based upon a signaling message or a configuration.

7. The method of claim 4 wherein the recording of the encoding indicator is based upon a registration.

8. The method of claim 4 wherein the recording of the decoding indicator is based upon a registration.

9. The method of claim 1 wherein a server device performs the verifying step and the selecting of the first converting device.

10. The method of claim 1 wherein a server device communicatively connected to at least one of the target communications device, the source communications device, and the converting devices performs the following steps of the method:

(a) verifying for at least one of the converting devices located in a signaling path for setting up a connection between the source communications device and the target communications device whether the first encoder is compatible with one of the second decoders of the first converting device and whether one of the second encoders of the first converting device is compatible with the first decoder of the target communications device, the first and second converting devices being within the signaling path;
(b) upon the determination that one of the second decoders of the first converting device is compatible with the first encoder of the source communications device and that one of the second encoders of the first converting device is compatible with the first decoder of the target communications device, selecting the first converting device for transmission of the payload data;
(c) upon the determination that none of the second decoders of the first converting device is compatible with the first encoder of the source communications device or that none of the second encoders of the first converting device is compatible with the first decoder of the target communications device, verifying whether the first encoder is compatible with one of the second decoders of the second converting device and whether one of the second encoders of the second converting device is compatible with the first decoder of the target communications device; and
(d) upon the determination that one of the second decoders of the second converting device is compatible with the first encoder of the source communications device and that one of the second encoders of the second converting device is compatible with the first decoder of the target communications device, selecting the second converting device for transmission of the payload data.

11. The method of claim 10 further comprising:
after selecting the second converting device for transmission of the payload data, the server device signaling to the second converting device that the second converting device is selected for the transmission of the payload data, the signaling also identifying the second decoder of the second converting device compatible with the first encoder to decode the payload data from the source communications terminal and the signaling also identifying the second encoder of the second converting device that is compatible with the first decoder to encode the decoded payload data for transmission of the payload data to the target communications device.

12. The method of claim 1 wherein the first converting device is a gateway and wherein the second converting device is a gateway.

13. The method of claim 1 wherein the payload data is transmitted via several of the converting devices if an absence of compatibility is ascertained for all the converting devices within the signaling path.

14. The method of claim 1 wherein the second encoder of the first converting device that is compatible with the first decoder encodes data pursuant to the second codec; and
wherein the second decoder of the first converting device that is compatible with the first encoder decodes data pursuant to the first codec.

15. A method for transmitting payload data from a source communications device with a first encoder for encoding the payload data via a first codec to a target communications device with a first decoder for decoding the payload data in a second codec that differs from the first codec and is incompatible with the first codec, the method comprising:
transmitting the payload data via a communications network having a plurality of converting devices, each of the converting devices having a plurality of second encoders and second decoders, the converting devices comprising a first converting device and a second converting device;
verifying for at least one of the converting devices located in a signaling path for setting up a connection between the source communications device and the target communications device whether the first encoder is compatible with one of the second decoders of the first converting device and whether one of the second encoders of the first converting device is compatible with the first decoder of the target communications device, the first and second converting devices being within the signaling path;
upon a determination that one of the second decoders of the first converting device is compatible with the first encoder of the source communications device and that one of the second encoders of the first converting device is compatible with the first decoder of the target communications device, selecting the first converting device for transmission of the payload data;
upon the selection of the first converting device the first converting device decoding the payload data encoded with the first encoder with the second decoder of the first converting device that is compatible with the first encoder and the first converting device encoding the received and decoded payload data with the second encoder of the first converting device that is compatible with the first decoder of the target communications device for sending the payload data to the target communications device;
the first converting device, upon a determination that none of the second decoders of the first converting device is compatible with the first encoder of the source communications device or that none of the second encoders of the first converting device is compatible with the first decoder of the target communications device, sending notification information to the second converting device such that the second converting device will verify whether the one of the second encoders of the second converting device is compatible with the first encoder and whether one of the second decoders of the second converting device is compatible with the first decoder;
in response to receiving the notification information from the first converting device, the second converting device verifying whether the first encoder is compatible with one of the second decoders of the second converting device and whether one of the second encoders of the second converting device is compatible with the first decoder of the target communications device;
upon a determination that one of the second decoders of the second converting device is compatible with the first encoder of the source communications device and that one of the second encoders of the second converting device is compatible with the first decoder of the target communications device, selecting the second converting device for transmission of the payload data;
the second converting device decoding the payload data encoded with the first encoder with the second decoder of the second converting device compatible with the first codec; and
the second converting device encoding the received and decoded payload data with the second encoder of the second converting device that is compatible with the first decoder of the target communications device for sending the payload data to the target communications device.

* * * * *